United States Patent
Yumoto et al.

(10) Patent No.: US 9,639,208 B2
(45) Date of Patent: May 2, 2017

(54) TOUCH PANEL SYSTEM

(71) Applicant: SHARP KABUSHIKI KAISHA, Osaka-shi, Osaka (JP)

(72) Inventors: Manabu Yumoto, Osaka (JP); Shunsuke Nagasawa, Osaka (JP); Masayuki Yamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/779,804

(22) PCT Filed: Jan. 30, 2014

(86) PCT No.: PCT/JP2014/052117
§ 371 (c)(1),
(2) Date: Sep. 24, 2015

(87) PCT Pub. No.: WO2014/156287
PCT Pub. Date: Oct. 2, 2014

(65) Prior Publication Data
US 2016/0048265 A1 Feb. 18, 2016

(30) Foreign Application Priority Data

Mar. 29, 2013 (JP) .................................. 2013-074408

(51) Int. Cl.
*G06F 3/041* (2006.01)
*G06F 3/01* (2006.01)
*G06F 3/044* (2006.01)

(52) U.S. Cl.
CPC ............ *G06F 3/0418* (2013.01); *G06F 3/017* (2013.01); *G06F 3/044* (2013.01); *G06F 2203/04104* (2013.01); *G06F 2203/04808* (2013.01)

(58) Field of Classification Search
CPC ........ G06F 3/0418; G06F 3/017; G06F 3/044; G06F 2203/04104; G06F 2203/04808
See application file for complete search history.

(56) References Cited

U.S. PATENT DOCUMENTS 6,445,384 B1 * 9/2002 Atwood .................. G06F 3/033
345/179
2005/0270276 A1 12/2005 Sugimoto et al.
(Continued)

FOREIGN PATENT DOCUMENTS

JP 2004-362429 A 12/2004
JP 2005-346507 A 12/2005
(Continued)

*Primary Examiner* — Andrew Sasinowski
*Assistant Examiner* — Brent D Castiaux
(74) *Attorney, Agent, or Firm* — Birch, Stewart, Kolasch & Birch, LLP

(57) ABSTRACT

A touch panel system (1) includes a touch panel (3) and a touch position detecting section (5) for detecting a touch position on the touch panel (3). The touch position detecting section (5) includes a touch start determining section (56) for (i) setting a determining region based on a touch start position candidate which is a touch position that has been detected relatively earliest and (ii) determining that touches have been started from the touch start position candidate in a case where the touches whose starting point is at the touch start position candidate have been successively detected within the determining region a predetermined number of times or more.

7 Claims, 7 Drawing Sheets

(56) References Cited

U.S. PATENT DOCUMENTS

2012/0194444 A1* 8/2012 Chang ................. G06F 3/04883
  345/173
2013/0076650 A1* 3/2013 Vik ........................ G06F 3/041
  345/173

FOREIGN PATENT DOCUMENTS

| WO | WO 2014/109262 A1 | 7/2014 |
| WO | WO 2014109260 A1 | 7/2014 |
| WO | WO 2014/141763 A1 | 9/2014 |

* cited by examiner

Determining region R based on touch start
position candidate (touch position P0)

TOUCH PANEL SYSTEM

TECHNICAL FIELD

The present invention relates to a touch panel system and an electronic device including the touch panel system. In particular, the present invention relates to (i) a touch panel system which can prevent erroneous recognition of a touch operation due to a touch-like-phenomenon caused by noise or the like and (ii) an electronic device including the touch panel system.

BACKGROUND ART

At present, applications of a touch panel system to various electronic devices, e.g., a mobile information device such as a smartphone and a vending machine such as a ticket bending machine, have rapidly been increased. A touch panel mainly used in such a touch panel system has been a resistive film type touch panel. However, in recent years, a projected capacitive type touch panel is becoming popular because of its capability of accepting multi-touch.

As an example of such a touch panel system, Patent Literature 1 discloses a command input device. The command input device includes a touch panel, a touch time detecting section, a touch frequency detecting section, a touch interval detecting section, and an input command determining section. The touch time detecting section detects time during which a finger is continuously making contact with the touch panel. The touch frequency detecting section detects the number of times that the finger touches the touch panel. The touch interval detecting section detects an interval from when the finger is off from the touch panel and to when the finger makes contact with the touch panel. The input command determining section determines an input command on the basis of detection results of the touch time detecting section, the touch frequency detecting section, and the touch interval detecting section.

FIG. 7 is a flowchart for describing an operation of the command input device disclosed in Patent Literature 1. As illustrated in FIG. 7, the command input device is arranged such that: (i) a command can be inputted on the basis of time, a frequency, and an interval of touch by the finger to the touch panel (S501 to 507); (ii) a command is determined on the basis of the inputted command (S508); (iii) an operation is selected on the basis of the determined command (S509); and (iv) the touch panel is controlled in accordance with the selected operation (S510).

CITATION LIST

Patent Literature

Patent Literature 1
Japanese Patent Application Publication Tokukai No. 2004-362429 (Publication date: Dec. 24, 2004)

SUMMARY OF INVENTION

Technical Problem

However, a conventional touch panel system has a problem that the conventional touch panel system erroneously recognizes, as a touch, a touch-like-phenomenon caused by noise or the like. Note that the touch-like-phenomenon denotes a phenomenon in which a touch is recognized although no touch operation is carried out.

Specifically, the conventional touch panel system detects a touch position at every predetermined time so that a continuous touch operation is recognized. Thus, in a case where, for example, a touch-like-signal has occurred on a touch panel due to noise or the like, a position of the touch-like-signal is also recognized as a touch position. As such, the conventional touch panel system erroneously recognizes, as a touch, the touch-like-phenomenon which does not need to be recognized.

Meanwhile, the command input device disclosed in Patent Literature 1 is intended to be applied to a car navigation device. The command input device determines an inputted command on the basis of continuous touch time, a touch frequency, and a touch time interval, with respect to the touch panel. From this, a driver does not need to look at the touch panel when inputting a command while driving, and the driver can accurately input a command even in a case where a vehicle is shaking. With the configuration, the command input device also erroneously recognizes, as a touch, the touch-like-phenomenon caused by noise or the like.

The present invention is attained in view of the above conventional problem. An object of the present invention is to provide a touch panel system and the like that can prevent erroneous recognition of the touch-like-phenomenon caused by noise or the like.

Solution to Problem

In order to attain the above object, a touch panel system according to one aspect of the present invention is a touch panel system including: a touch panel; and a touch position detecting section for detecting a touch position on the touch panel, the touch position detecting section including: a touch start determining section for (i) setting a determining region based on a touch start position candidate which is a touch position that has been detected relatively earliest and (ii) determining that touches have been started from the touch start position candidate in a case where the touches whose starting point is at the touch start position candidate have been successively detected within the determining region a predetermined number of times or more.

Advantageous Effects of Invention

According to one aspect of the present invention, it is possible to prevent erroneous recognition of a touch-like-phenomenon caused by noise or the like

DESCRIPTION OF EMBODIMENTS

Embodiment 1

(Configuration of Touch Panel System 1)

Figure 1:
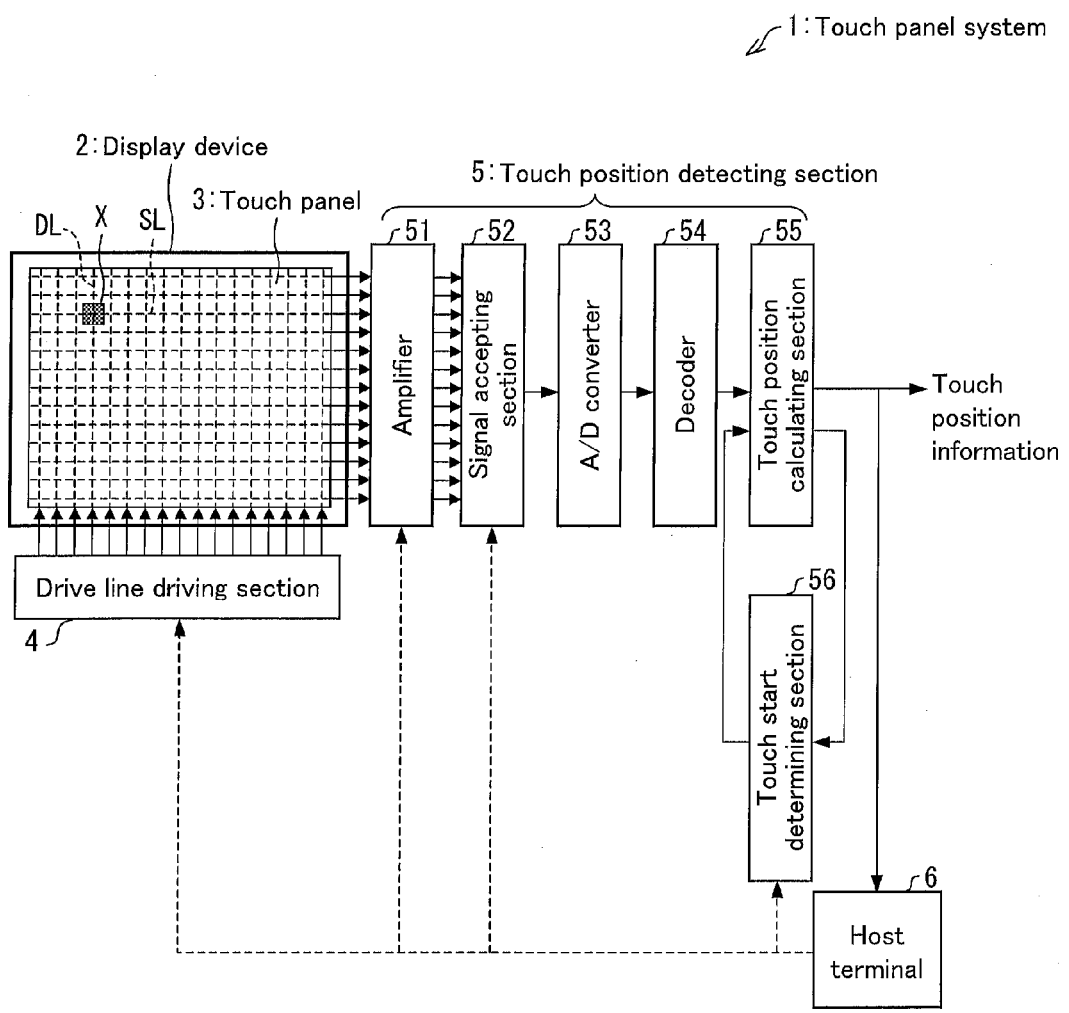
FIG. 1 is a view schematically illustrating a touch panel system according to Embodiment 1 of the present invention.

The following discusses embodiments of the present invention in detail. FIG. 1 is a view schematically illustrating a basic configuration of a touch panel system 1 according to Embodiment 1 of the present invention. As illustrated in FIG. 1, the touch panel system 1 includes a display device 2, a touch panel 3, a drive line driving section 4, a touch position detecting section 5, and a host terminal 6. The following description assumes that a side on which a user carries out a touch operation is a front surface (or an upper side).

The display device 2 has a display surface on which various icons for operations, character information corresponding to operational instructions by the user, and the like are to be displayed. The display device 2 is made up of, for example, a liquid crystal display, a plasma display, an organic EL display, a field emission display (FED), or the like. These displays are widely used in electronic devices for daily use, so that the touch panel system 1 has high versatility. The display device 2 can be arbitrarily configured, and an arrangement of the display device 2 is not specifically limited. Further, it is preferable that the display device 2 have, as its thin film transistors (TFTs), TFTs whose semiconductor layer is made of so-called oxide semiconductor. The oxide semiconductor encompasses, for example, an InGaZnO-based oxide semiconductor. The display device 2 having the InGaZnO-based oxide semiconductor can realize display of a high definition image with greatly reduced electric power consumption.

To the touch panel 3, the user inputs various operational instructions by carrying out a touch (push) operation with respect to a surface of the touch panel 3 with an indicator such as his/her finger or a pen. The touch panel 3 is stacked on the front surface (upper surface) of the display device 2 so as to cover the display surface of the display device 2. In the present embodiment, a projected capacitive type touch panel is used as the touch panel 3. The capacitive touch panel 3 has advantages such as high light transmittance and high durability. However, a type of the touch panel 3 is not limited to the projected capacitive type and can be another type. The type of the touch panel 3 can be, for example, a resistive film type, an electromagnetic inductive type, an ultrasonic surface acoustic wave type, or an infrared scanning type.

Specifically, the touch panel 3 includes a plurality of drive lines DL which are provided along the display surface so as to be parallel to each other, and a plurality of sense lines SL which are provided along the display surface so as to be parallel to each other and intersect with the plurality of drive lines DL in a grade separation manner. At each of intersections of the plurality of drive lines DL and the plurality of sense lines SL, a capacitor is formed. The plurality of drive lines DL and the plurality of sense lines SL can be made of, for example, (i) a transparent wiring material such as indium tin oxide (ITO) or (ii) a metallic mesh. The plurality of drive lines DL and the plurality of sense lines SL are connected to the display device 2 (a panel unit which constitutes a part of the display surface). Note that FIG. 1 deals with an example in which the plurality of drive lines DL and the plurality of sense lines SL vertically intersect with each other in a grade separation manner, but the plurality of drive lines DL and the plurality of sense lines SL can alternatively intersect with each other in a grade separation manner at any angle other than a vertical direction.

The drive line driving section 4 is connected with the plurality of drive lines DL and, when the touch panel system 1 is activated, the drive line driving section 4 applies electrical potentials to the plurality of the drive lines DL at constant intervals. The drive line driving section 4 causes the plurality of sense lines SL, which intersect with the plurality of drive lines DL in the grade separation manner, to generate condition signals by driving the plurality of drive lines DL. The condition signal is a signal which indicates a condition of a touch at or near the intersections (hereinafter, referred to as a "detection region" (detection region X illustrated in FIG. 1)) of the plurality of drive lines DL and the plurality of sense lines SL on the touch panel 3.

A value of the condition signal varies in accordance with the capacitance between the drive line DL and the sense line SL, and indicates whether the indicator is in contact with or is being near to the detection region X on the touch panel 3. That is, the condition signal indicates (i) the presence or absence of the indicator being in contact with or being near to the detection region X, (ii) a distance between the detection region X and the indicator, or the like. Note that, as the indicator comes closer to the detection region X or when the indicator is in contact with the detection region X, the capacitance becomes smaller.

The touch position detecting section 5 processes a signal supplied from the touch panel 3 so as to detect a touch position. That is, the touch position detecting section 5 detects a position of the touch by the indicator, which is in contact with or is being near to the display surface, by processing the condition signal generated on the sense line SL. The touch position detecting section 5 includes, from a touch panel 3 side, an amplifier 51, a signal accepting section 52, an A/D converter 53, a decoder 54, a touch position calculating section 55, and a touch start determining section 56 in this order.

The amplifier 51 amplifies the condition signals generated on the plurality of sense lines SL. The signal accepting section 52 accepts the condition signals amplified by the amplifier 51 and supplies the amplified condition signals in a time division manner. The A/D converter 53 converts the condition signals, which have been supplied from the signal accepting section 52 and are analog signals, into respective digital signals. The decoder 54 calculates, on the basis of the digital signals converted by the A/D converter 53, a changed amount of capacity distribution in the touch panel 3. The touch position calculating section 55 calculates, on the basis of the changed amount of the capacity distribution calculated by the decoder 54, a position of the touch on the touch panel 3, and then generates touch position information indicative of the calculated position of the touch. The touch start determining section 56 determines whether or not a continuous touch operation has been started from a touch start position candidate having been detected by the touch position detecting section 5. The touch start determining section 56 will be described later in detail.

The host terminal 6 controls the plurality of drive lines DL which are driven by the drive line driving section 4. The host terminal 6 also controls the plurality of sense lines SL which generate the condition signals to be processed by the touch position detecting section 5. The following description deals with an example in which the host terminal 6 controls the plurality of drive lines DL and the plurality of sense lines SL. Note, however, that the host terminal 6 can alternatively control only the plurality of drive lines DL or the plurality of sense lines SL.

(Basic Operation of Touch Panel System 1)

Next, the following discusses an example of a basic operation of the touch panel system 1 with reference to FIG. 1. Note that the following discusses a single trial operation in which the touch panel system 1 detects an indicator that is in contact with or is being near to the touch panel 3.

First, the drive line driving section 4 drives the plurality of drive lines DL so that condition signals are generated on the plurality of sense lines SL. Next, the amplifier 51 amplifies the condition signals generated on the plurality of sense lines SL. Further, the signal accepting section 52 supplies the condition signals, which have been amplified by the amplifier 51, in a time division manner. Note that the host terminal 6 controls operation of each of the drive line driving section 4, the amplifier 51, and the signal accepting section 52. That is, the host terminal 6 controls the plurality of drive lines DL to be driven and the plurality of sense lines SL on which condition signals to be processed are generated.

Next, the A/D converter 53 converts the analog signals, which have been supplied from the signal accepting section 52, into respective digital signals each having a predetermined number of bits. Subsequently, the decoder 54 calculates, on the basis of the digital signals converted by the A/D converter 53, a changed amount of capacity distribution in the touch panel 3. For example, before a touch operation is detected, the decoder 54 obtains digital signals indicative of a case where a touch subject (indicator) does not exist on the touch panel 3 and calculates in advance capacity distribution of the case where the touch subject (indicator) does not exist on the touch panel 3. The decoder 54 then receives from the A/D converter 53 digital signals indicative of a case where the indicator has been detected and calculates capacity distribution of the case where the indicator is present. After that, the decoder 54 compares the pre-calculated capacity distribution of the case where the touch subject is absent with the capacity distribution of the case where the touch subject is present, so as to calculate a changed amount of the capacity distribution. This changed amount of the capacity distribution can be rephrased as an amount by which capacitance is changed due to the touch subject (indicator).

The touch position calculating section 55 calculates, on the basis of the changed amount of the capacity distribution calculated by the decoder 54, a position of the touch subject on the touch panel 3, and generates touch position information. The touch position calculating section 55 calculates the position of the touch subject on the touch panel 3 by, for example, determining that the touch subject exists at a position at which the changed amount of the capacitance is larger than a threshold for determining a touch. The touch position calculating section 55 calculates a touch position, at each time point, detected at an arbitrary scanning cycle.

The touch start determining section 56 determines whether or not a touch operation which has been calculated by the touch position calculating section 55 and whose starting point is at a touch start position candidate is a touch operation that is supposed to be detected.

Figure 2:
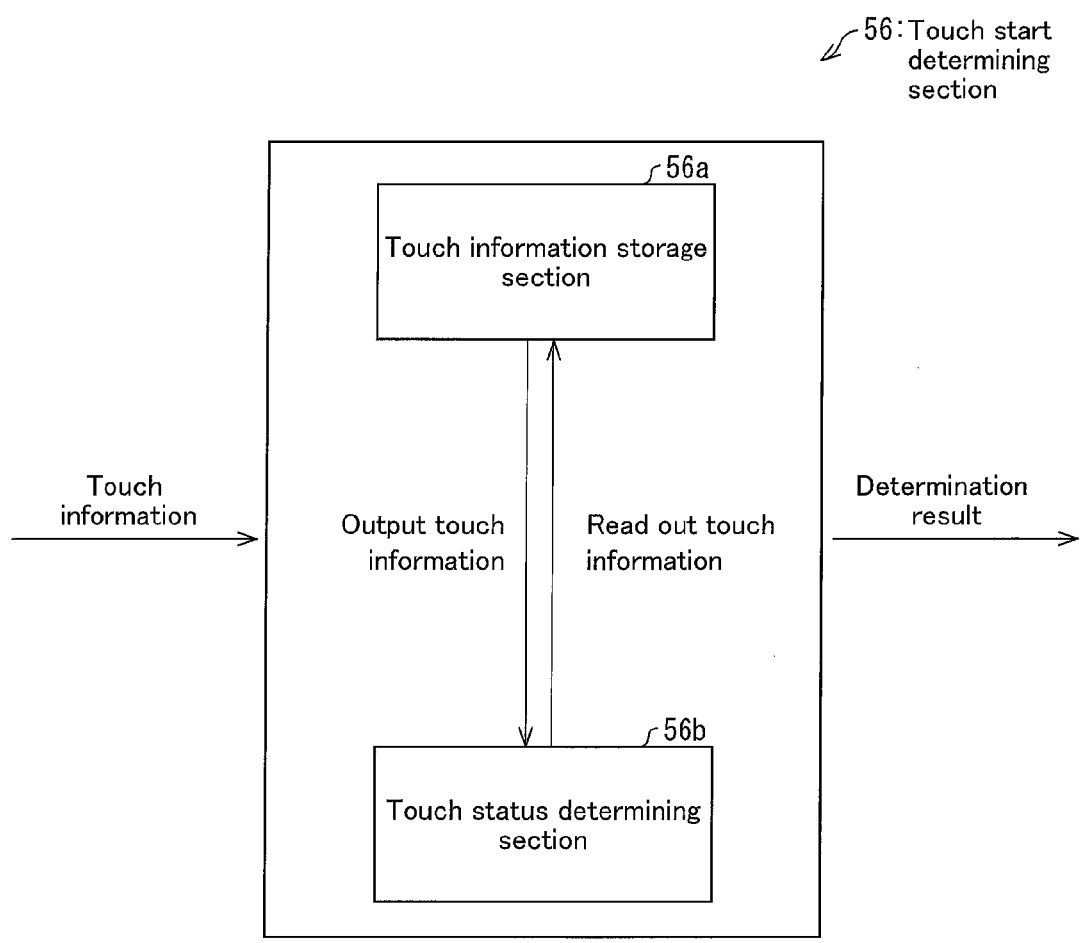
FIG. 2 is a block diagram illustrating a touch start determining section of the touch panel system illustrated in FIG. 1.

The following description will discuss an example of the touch start determining section 56 with reference to FIG. 2. FIG. 2 is a block diagram illustrating a configuration of the touch start determining section 56 provided in the touch panel system 1 illustrated in FIG. 1. As illustrated in FIG. 2, the touch start determining section 56 includes a touch information storage section 56a and a touch status determining section 56b.

The touch information storage section 56a stores touch information relating to the touch position calculated by the touch position calculating section 55. Specifically, the touch information storage section 56a stores relative time of a touch calculated by the touch position calculating section 55, together with touch position information of the touch (e.g., coordinates of touch position and so on). From this, in a case where a continuous touch operation is carried out on the touch panel 3, the touch information storage section 56a continuously stores touch information during the continuous touch operation. That is, the touch information storage section 56a stores touch information in real time.

The touch status determining section 56b reads out the touch information stored in the touch information storage section 56a. The touch information stored in the touch information storage section 56a encompasses not only information of a touch by the indicator, but also information of a touch-like-phenomenon caused by noise or the like and erroneously recognized as a touch. Under the circumstances, in a case where continuous pieces of touch information are stored in the touch information storage section 56a, the touch status determining section 56b determines whether or not a touch by the indicator has been started from a touch position of a piece of touch information that has been stored first. A process of the touch status determining section 56b will be described later in detail.

The touch panel system 1 continuously detects the indicator that is the touch subject by repeating the trial operation described above.

With reference to the touch position information supplied from the touch position calculating section 55 as necessary, the host terminal 6 can control each section of the drive line driving section 4 and the touch position detecting section 5. Further, the host terminal 6 can control a frame rate, which is the number of times that the touch position detecting section 5 attempts to detect a touch subject per unit time (e.g., per second). That is, in the touch panel system 1, the host terminal 6 can arbitrarily control settings of (i) the plurality of drive lines DL which are supposed to be driven by the drive line driving section 4, (ii) the plurality of sense lines SL on which the condition signals to be processed by the touch position detecting section 5 are supposed to be generated, (iii) the frame rate, (iv) detection sensitivity, and the like.

(Process of Touch Start Determining Section 56)

Next, the following discusses in detail the touch start determining section 56 which is a characteristic feature of the touch panel system 1. In the touch panel system 1, the touch position detecting section 5 detects a touch position at every predetermined time, so that a touch position at a certain time point is recognized. From this, in a case where a touch-like-signal has occurred on the touch panel 3 due to noise or the like, a position of the touch-like-signal which position is not supposed to be recognized may be erroneously recognized as a touch position.

Figure 3:
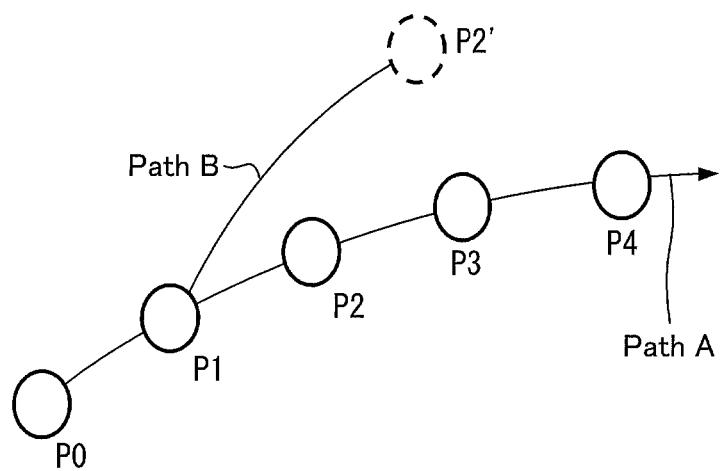
FIG. 3 is a view illustrating an example of a series of touches detected in the touch panel system illustrated in FIG. 1.

For example, FIG. 3 is a view illustrating an example of a continuous touch operation detected in the touch panel system 1 illustrated in FIG. 1. Specifically, FIG. 3 illustrates (i) touch positions that are detected during a touch operation (path A) that is made by the indicator and is supposed to be detected and (ii) touch positions that are detected during a touch operation (path B) including the touch-like-phenomenon caused by noise or the like. The path A is a path in which touches are detected at a touch position $P_0 \rightarrow$ a touch position $P_1 \to$ a touch position $P_2 \to$ a touch position $P_3 \to$ a touch position $P_4$ in this order. The path B is a path in which touches are detected at the touch position $P_0 \to$ the touch position $P_1 \to$ a touch position $P_{2'}$ in this order. Each of the path A and the path B is a touch operation whose starting point is at the touch position $P_0$ (touch start position). The path B includes the touch position $P_{2'}$ as a position at which the touch-like-phenomenon has occurred.

As such, the touch panel system 1 may erroneously recognize the touch-like-phenomenon as a touch (touch position $P_{2'}$) even though no touch operation is carried out. That is, the touch panel system 1 may recognize, as the touch operation whose starting point is at the touch position $P_0$ (touch start position), both of (i) touch operations on the path A that are supposed to be recognized and (ii) touch operations on the path B that do not need to be recognized.

In view of this, the touch panel system 1 includes, as a measure to prevent erroneous recognition of the touch-like-phenomenon such as the path B, the touch start determining section 56. The touch start determining section 56 recognizes a touch operation on the path A as a touch operation whose starting point is at the touch position $P_0$ (touch start position). In contrast, the touch start determining section 56 does not recognize a touch operation on the path B as a touch operation whose starting point is at the touch position $P_0$ (touch start position).

Figure 4:
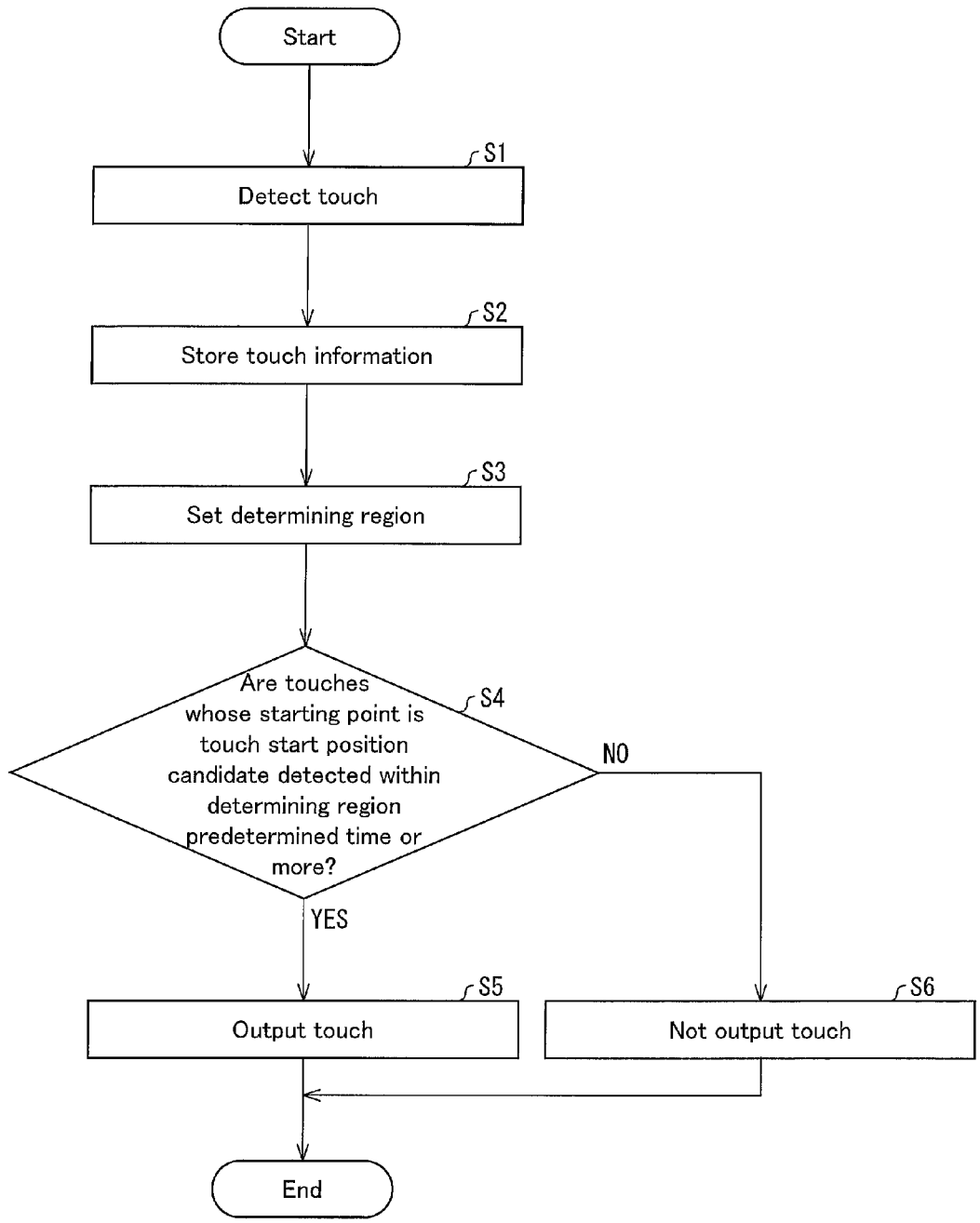
FIG. 4 is a flowchart illustrating a process of the touch start determining section of the touch panel system illustrated in FIG. 1.
Figure 5:
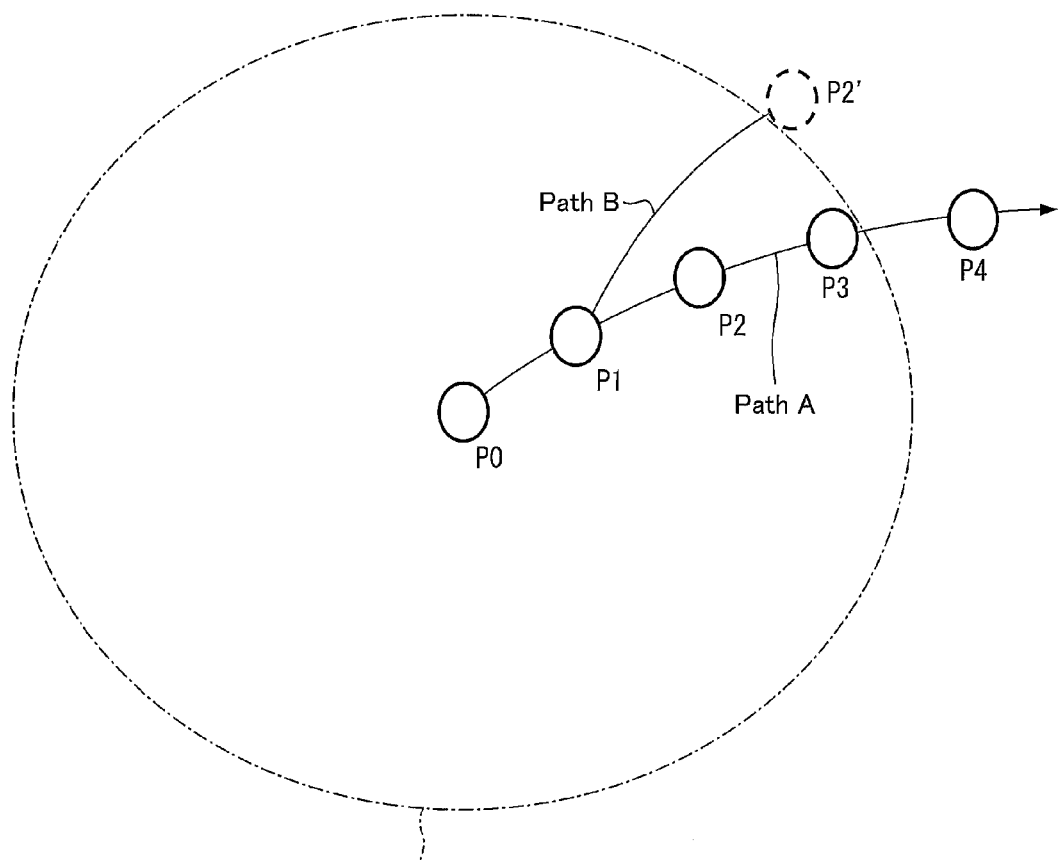
FIG. 5 is a view schematically illustrating the process of the touch start determining section of the touch panel system illustrated in FIG. 1.

The following discusses, with reference to FIGS. 4 and 5, an example of a process which the touch start determining section 56 carries out when determining a start of a touch. FIG. 4 is a flowchart illustrating the process of the touch start determining section 56 of the touch panel system 1 illustrated in FIG. 1. FIG. 5 is a view schematically illustrating the process of the touch start determining section 56 of the touch panel system 1 illustrated in FIG. 1.

As illustrated in FIG. 4, the touch position detecting section 5 processes a signal supplied from the touch panel 3 at an arbitrary scanning cycle so as to detect a touch position (S1). Specifically, when a touch operation is carried out on the touch panel 3, the touch position calculating section 55 calculates a current touch position based on a changed amount of capacitance of the touch panel 3, and supplies a result of the calculation to the touch start determining section 56 (touch information storage section 56a).

Next, the touch information storage section 56a stores touch information (relative time, coordinates, and the like of the detected touch position) calculated by the touch position calculating section 55 (S2). In a case where a continuous touch operation is carried out on the touch panel 3, (i) the touch position detecting section 5 continuously detects touches during the continuous touch operation, and accordingly, (ii) the touch information storage section 56a continuously stores pieces of touch information during the continuous touch operation.

Next, the touch status determining section 56b reads out the touch information stored in the touch information storage section 56a, and determines whether or not the continuous touch operation is a touch operation that is supposed to be recognized (S3 through S6). In a case where pieces of touch information are continuously stored in the touch information storage section 56a, the pieces of touch information may contain not only information of a touch by the indicator but also information of the touch-like-phenomenon that has been erroneously recognized as a touch. In view of this, the touch status determining section 56b carries out the process based on an assumption that, out of the pieces of touch information continuously stored in the touch information storage section 56a, a piece of touch information that has been stored first (at a relatively earliest time point) is a touch start position candidate.

Specifically, the touch status determining section 56b first sets a determining region based on the touch start position candidate (S3). Next, the touch status determining section 56b determines, based on the number of times that touches whose starting point is at the touch start position candidate are successively detected within the determining region, whether or not a touch has been started from the touch start position candidate (S4). In a case where touches whose starting point is at the touch start position candidate have been successively detected within the determining region a predetermined number of times or more, the touch status determining section 56b outputs the touches as a touch whose starting point is at the touch start position candidate (S5). On the other hand, in a case where touches whose staring point is at the touch start position candidate have not been successively detected within the determining region the predetermined number of times or more, the touch status determining section 56b does not output the touch as a touch whose starting point is at the touch start position candidate (S6).

Here, the following discusses the process of the touch status determining section 56b (S3 through S6 in FIG. 4) in detail with reference to FIG. 5. An example of FIG. 5 indicates, as with the case of FIG. 3, (i) touch positions of a touch operation, which has been carried out by the indicator and is supposed to be detected, on the path A (i.e., the touch position $P_0 \to$ the touch position $P_1 \to$ the touch position $P_2 \to$ the touch position $P_3 \to$ the touch position $P_4$), and (ii) touch positions, on the path B, of a touch operation including the touch-like-phenomenon (the touch position $P_{2'}$) caused by noise or the like (i.e., the touch position $P_0 \to$ the touch position $P_1 \to$ the touch position $P_{2'}$).

On both of the path A and the path B, the touch position $P_0$ is a touch position that has been stored first (at the relatively earliest time point). Therefore, the touch status determining section 56b assumes that the touch position $P_0$ is the touch start position candidate. Next, the touch status determining section 56b sets a determining region R based on the touch position $P_0$. Here, a circle whose center is the touch position $P_0$, i.e., the touch start position candidate, is set as the determining region R (corresponding to S3 of FIG. 4).

Further, the touch status determining section 56b determines whether or not touches whose starting point is at the touch start position candidate (i.e., the touch position $P_0$) have been successively detected within the determining region R a predetermined number of times or more. Here, the predetermined number of times to serve as a criterion for the determination is set to "two". That is, in the example of FIG. 5, the touch status determining section 56b determines, based on three touches including the touch position $P_0$, whether or not a touch has been started from the touch start position candidate (touch position $P_0$) (corresponding to S4 of FIG. 4).

Specifically, during the touch operation of the path A, three touch positions starting from the touch position $P_0$ (i.e., the touch position $P_0 \to$ the touch position $P_1 \to$ the touch position $P_2 \to$ the touch position $P_3$) are successively detected in the determining region R. As such, during the touch operation of the path A, touches whose starting position is at the touch position $P_0$ are successively detected "two times or more" (YES in S4 of FIG. 4). In this case, the touch status determining section 56b (i) determines that the touch operation of the path A is a series of touches which has been started from the touch position $P_0$, and (ii) outputs a result of the determination to the touch position calculating section 55 (corresponding to S5 of FIG. 4). As such, the touch operation of the path A is dealt with as the series of touches which has been started from the touch position $P_0$.

On the other hand, during the touch operation of the path B, the touch position $P_1$, which is a next touch position whose starting point is at the touch position $P_0$, is detected within the determining region R. However, the touch position $P_{2'}$, which is a touch position next to the touch position $P_1$, is a position of the touch-like-phenomenon and is detected outside the determining region R. As such, during the touch operation of the path B, touches whose starting point is at the touch position $P_0$ are not successively detected "two times or more" (NO in S4 of FIG. 4). In this case, the touch status determining section 56b (i) determines that the touch operation of the path B is not the series of touches which has been started from the touch position $P_0$, and (ii) outputs the result of the determination to the touch position calculating section 55 (corresponding to S5 of FIG. 4). As such, the touch operation of the path B is dealt with as touches which have not been started from the touch position $P_0$, and the touch start determining section 56 (touch status determining section 56b) does not output the touch operation of the path B as the series of touches. That is, the touch operation of the path B is determined to include the touch-like-phenomenon caused by noise or the like, and the touch position $P_0$ is eliminated from the touch start position candidate.

As described above, in the touch panel system 1, the touch position detecting section 5 detects a continuous touch operation on the touch panel 3. From the detected series of touches, a touch having been detected relatively earliest is assumed to be the touch start position candidate (touch position $P_0$). The touch start determining section 56 sets the determining region R based on the touch start position candidate (touch position $P_0$). Further, the touch start determining section 56 determines, based on the number of times that touches whose starting point is the touch start position candidate (touch position $P_0$) are successively detected within the determining region R thus set, whether or not the touches have been started from the touch start position candidate (touch position $P_0$). That is, during a continuous touch operation by the indicator such as a finger or a pen (path A), the touch continues from the touch start position candidate (touch position $P_0$), and therefore a plurality of touches are detected in the determining region R. In contrast, in a case where the continuous touch operation by the indicator includes the touch-like-phenomenon (touch position $P_{2'}$) caused by noise or the like (path B), the touch-like-phenomenon is mostly detected at a position far from (i) the touch start position candidate (touch position $P_0$) and (ii) a position of a touch, by the indicator, whose starting point is the touch start position candidate (touch position $P_0$). That is, the touch position $P_{2'}$ of the touch-like-phenomenon is mostly detected outside the determining region R.

As such, the touch start determining section 56 determines a touch start position by distinguishing, based on the number of times of successive touches detected within the determining region R, the touch operation of the path A, which is supposed to be detected, from the touch operation of the path B (i.e., the touch operation including the touch-like-phenomenon (touch position $P_{2'}$)), which is supposed not to be detected. Therefore, it is possible to prevent erroneous recognition of the touch operation due to the touch-like-phenomenon (touch position $P_{2'}$).

Note that the determining region R merely needs to be set so that (i) a touch by the indicator can be distinguished from the touch-like-phenomenon and (ii) a start position of the continuous touch operation can be determined. In other words, the determining region R merely needs to be set so that (i) most (preferably, all) of the touch-like-phenomenon (touch position $P_{2'}$) is eliminated and (ii) only the continuous touch operation is successively detected within the determining region R.

A method for setting the determining region R is not particularly limited. However, it is preferable to set the determining region R so that, for example, an area of the determining region R is proportional to the number of times (predetermined number of times) of successive touches within the determining region R, which number is a criterion for the determination. For example, (i) in a case where the determining region R has a large area, a larger number of times of successive touches is set and, (ii) in a case where the determining region R has a small area, a smaller number of times of successive touches is set. This causes the area of the determining region R to be linked to the number of times of successive touches, so that the touch-like-phenomenon is more reliably detected outside the determining region R. Therefore, it is possible to more reliably prevent erroneous recognition of the touch operation due to the touch-like-phenomenon (touch position $P_{2'}$).

Further, it is preferable to set the determining region R based on at least one of a scanning cycle of the touch panel 3, an area of the touch panel 3, and the predetermined number of times. Elapsed time from a touch start is proportional to each of the scanning cycle, the area, and the predetermined number of times (i.e., the number of times of successive touches within the determining region R). In contrast, the touch-like-phenomenon occurs without depending on the elapsed time from the touch start. Therefore, in a case where the determining region R is set based on the scanning cycle, the area of the touch panel, or the number of times of successive touches within the determining region, the touch-like-phenomenon (touch position $P_{2'}$) that does not depend on the elapsed time from the touch start is more reliably detected outside the determining region R. Therefore, it is possible to more reliably prevent erroneous recognition of the touch operation due to the touch-like-phenomenon (touch position $P_{2'}$).

The determining region R can be set in arbitrary shape and area. However, it is preferable that the determining section R has a circular shape whose center is the touch start position candidate (touch position $P_0$). In a case where the determining region R has the circular shape, the determining region R is set to reach equal ranges whose center is the touch start position candidate (touch position $P_0$). This makes it possible to eliminate the touch-like-phenomenon (touch position $P_{2'}$) that occurs in any directions from the touch start position candidate (touch position $P_0$). Therefore, it is possible to prevent erroneous recognition of the touch-like-phenomenon (touch position $P_{2'}$) regardless of a position, at which (or a direction, in which) the touch-like-phenomenon (touch position $P_{2'}$) occurs, with respect to the touch start position candidate (touch position $P_0$).

Note that a person skilled in the art would be able to set, based on empirical rules, the determining region R and the number of times of successive touches within the determining region R which number is a criterion for the determination.

Further, in the touch panel system 1, it is preferable that, in a case where touches whose starting point is the touch start position candidate (touch position $P_0$) are not successively detected within the determining region R the predetermined number of times or more, the touch start determining section 56 (touch status determining section 56*b*) do not output, as a touch, the touches whose starting point is the touch start position candidate (touch position $P_0$).

That is, it is preferable that the touch start determining section 56 output, as the series of touches, touches whose starting point is the touch start position candidate (touch position $P_0$) only in a case where the touches whose start point is the touch start position candidate (touch position $P_0$) have been successively detected within the determining region R the predetermined number of times or more. From this, only the touch operation of the path A that is supposed to be detected is outputted as the series of touches. This makes it possible to prevent erroneous recognition of the touch operation due to the touch-like-phenomenon (touch position $P_2$).

Note that the above description dealt with an example of touch start determination of a case where two touch operations (on the path A and the path B) have been separately detected. However, as with the above case, it is also possible to determine that only the touch operation of the path A is a touch that has been started from the touch start position candidate, even in a case where the two touch operations (on the path A and the path B) have been detected at the same time.

Embodiment 2

Figure 6:
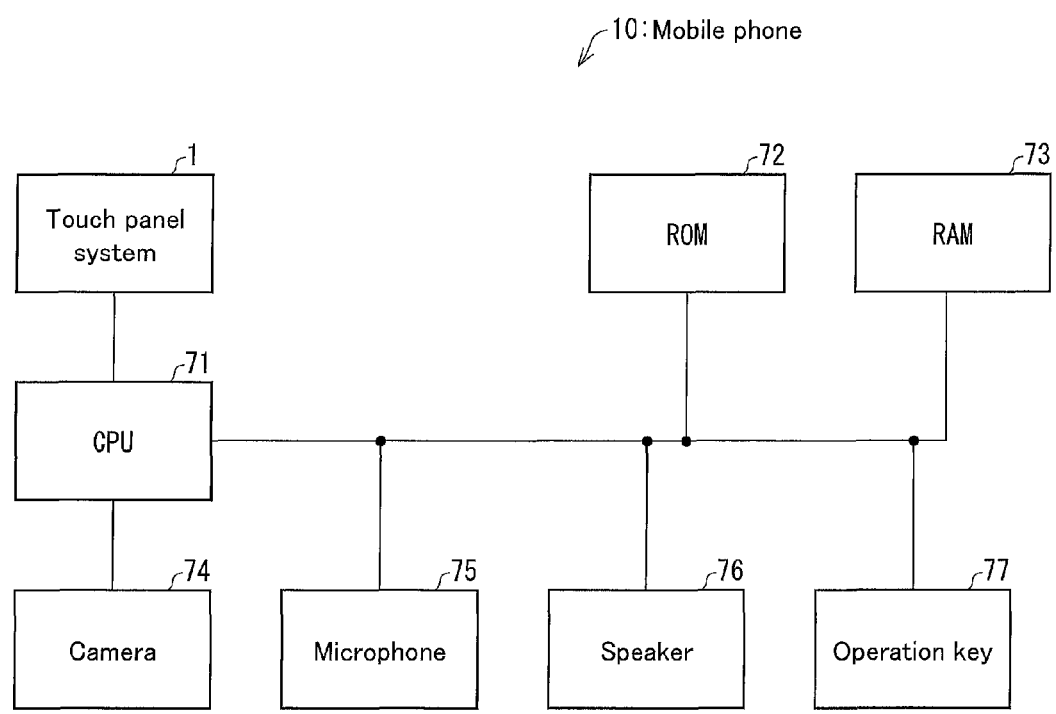
FIG. 6 is a block diagram illustrating a configuration of a mobile phone according to Embodiment 2 of the present invention.
Figure 7:
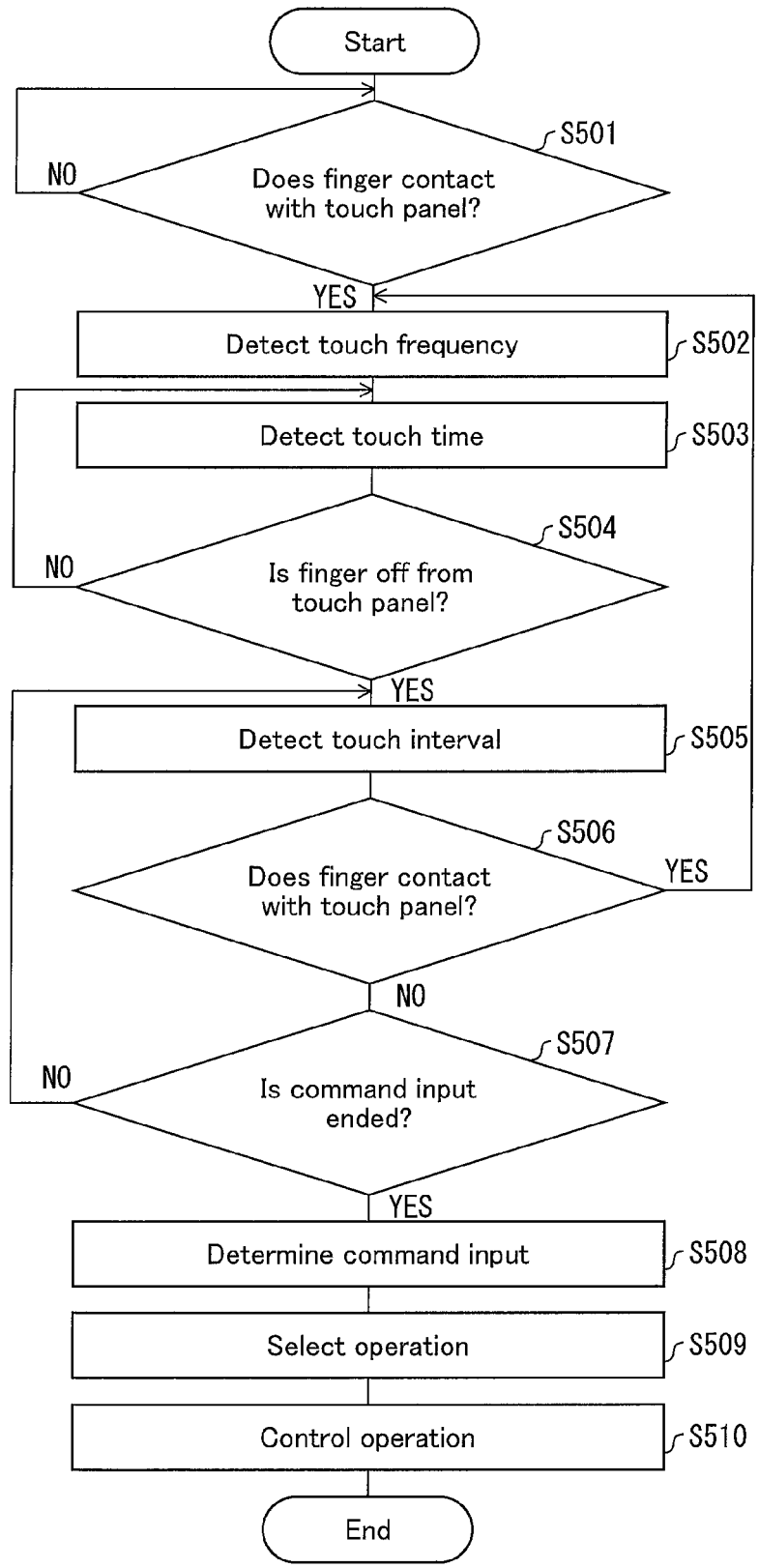
FIG. 7 is a flowchart for describing an operation of a command input device disclosed in Patent Literature 1.

FIG. 6 is a functional block diagram illustrating a configuration of a mobile phone 10 including the touch panel system 1. The mobile phone (electronic device) 10 includes a CPU 71, a RAM 73, a ROM 72, a camera 74, a microphone 75, a speaker 76, an operation key 77, and the touch panel system 1. These components are connected to each other via a data bus.

The CPU 71 controls an operation of the mobile phone 10. The CPU 71 executes a program stored in, for example, the ROM 72. The operation key 77 is used by a user of the mobile phone 10 to enter instructions. The RAM 73 is a volatile memory which stores therein (i) data generated when the CPU 71 has executed the program or (ii) data entered via the operation key 77. The ROM 72 is an involatile memory which stores data therein.

The ROM 72 is a ROM, such as an erasable programmable read-only memory (EPROM) or a flash memory, into which data can be written or from which data can be deleted. Note that, although not illustrated in FIG. 6, the mobile phone 10 can have an interface (IF) for being connected with another electronic apparatus via a wire.

The camera 74 takes an image of a subject in accordance with a user's operation of the operation key 77. Note that the image data of the subject thus taken is stored in the RAM 73 or an external memory (e.g., a memory card). The microphone 75 accepts audio from a user. The mobile phone 10 digitizes the audio (analog data) thus accepted, and transmits the audio thus digitized to a destination (such as other mobile phone). The speaker 76 outputs sounds based on data such as music data stored in the RAM 73.

The CPU 71 controls an operation of the touch panel system 1. The CPU 71 executes a program stored in, for example, the ROM 72. The RAM 73 is a volatile memory which stores therein data generated when the CPU 71 has executed the program. The ROM 72 is an involatile memory which stores data therein. The touch panel system 1 displays images stored in the ROM 72 and/or in the RAM 73.

Further, the present invention can be rephrased as the following.

[Main Points]

A touch panel system 1 according to Aspect 1 of the present invention is a touch panel system including: a touch panel 3; and a touch position detecting section 5 for detecting a touch position on the touch panel 3, the touch position detecting section 5 including: a touch start determining section 56 for (i) setting a determining region R based on a touch start position candidate (touch position $P_0$) which is a touch position that has been detected relatively earliest and (ii) determining that touches have been started from the touch start position candidate (touch position $P_0$) in a case where the touches whose starting point is at the touch start position candidate (touch position $P_0$) have been successively detected within the determining region R a predetermined number of times or more.

According to the above arrangement, the touch start determining section 56 determines a touch start position by distinguishing, based on the number of times of successive touches detected within the determining region R, the touch operation of the path A, which is supposed to be detected, from the touch operation of the path B (i.e., the touch operation including the touch-like-phenomenon (touch position $P_2$)), which is supposed not to be detected. Therefore, it is possible to prevent erroneous recognition of the touch operation due to the touch-like-phenomenon (touch position $P_2$).

The touch panel system 1 according to Aspect 2 of the present invention is preferably arranged such that, in Aspect 1, the touch start determining section 56 sets the determining region R so that an area of the determining region R is proportional to the predetermined number of times.

According to the above arrangement, the area of the determining region R is linked to the number of times of successive touches within the determining region R, which number is a criterion for the determination, so that the touch-like-phenomenon is more reliably detected outside the determining region R. Therefore, it is possible to prevent erroneous recognition of the touch-like-phenomenon (touch position $P_2$, with a higher accuracy.

The touch panel system 1 according to Aspect 3 of the present invention is preferably arranged such that, in Aspect 1 or 2, in a case where touches whose starting point is at the touch start position candidate (touch position $P_0$) have not been successively detected within the determining region R the predetermined number of times or more, the touch start determining section 56 does not output, as a touch, the touches whose starting point is at the touch start position candidate (touch position $P_0$).

According to the above arrangement, the touch start determining section 56 determines that touches whose starting point is the touch start position candidate (touch position $P_0$) are the series of touches only in a case where the touches whose start point is the touch start position candidate (touch position $P_0$) have been successively detected within the determining region R the predetermined number of times or more. From this, only the touch operation of the path A that is supposed to be detected is outputted as the series of touches. This makes it possible to prevent erroneous recognition of the touch operation due to the touch-like-phenomenon (touch position $P_2$).

The touch panel system 1 according to Aspect 4 of the present invention can be arranged such that, in any one of Aspects 1 through 3, the touch start determining section 56 sets the determining region R based on at least one of a scanning cycle of the touch panel 3, an area of the touch panel 3, and the predetermined number of times. According to the above arrangement, the determining region R is set based on the scanning cycle, the area of the touch panel 3, and/or the number of times of successive touches within the determining region R, each of which is proportional to elapsed time from a touch start. Thus, the touch-like-phenomenon (touch position $P_{2'}$) that does not depend on the elapsed time from the touch start is more reliably detected outside the determining region R. Therefore, it is possible to more reliably prevent erroneous recognition of the touch operation due to the touch-like-phenomenon (touch position $P_{2'}$).

The touch panel system 1 according to Aspect 5 of the present invention is preferably arranged such that, in any one of Aspects 1 through 4, the touch start determining section 56 sets the determining region R so that the determining region R has a circular shape whose center is at the touch start position candidate (touch position $P_0$).

According to the above arrangement, the determining region R has the circular shape, so that the determining region R is set to reach equal ranges whose center is the touch start position candidate (touch position $P_0$). This makes it possible to eliminate the touch-like-phenomenon (touch position $P_{2'}$) that occurs in any directions from the touch start position candidate (touch position $P_0$). Therefore, it is possible to prevent erroneous recognition of the touch-like-phenomenon (touch position $P_{2'}$) regardless of a position, at which (or a direction, in which) the touch-like-phenomenon (touch position $P_{2'}$) occurs, with respect to the touch start position candidate (touch position $P_0$).

The touch panel system 1 according Aspect 6 of the present invention can be arranged such that, in any one of Aspects 1 through 5, the touch panel is a projected capacitive type touch panel.

According to the above configuration, since the touch panel system 1 includes the touch panel whose operation principle is the projected capacitive type, it is possible to provide a touch panel system capable of accepting multi-touch (multi-point detection).

The touch panel system 1 according to Aspect 7 of the present invention can further include, in any one of Aspects 1 through 6, a display device and can be arranged such that the touch panel is provided on a front surface of the display device.

According to the arrangement, since the touch panel is provided on the front surface of the display device, it is possible to prevent erroneous recognition of noise as a touch position which noise has occurred in the display device.

The touch panel system 1 according to Aspect 8 of the present invention can be arranged such that, in any one of Aspects 1 through 7, the display device is a liquid crystal display, a plasma display, an organic EL display, a field emission display, or a display having an InGaZnO-based oxide semiconductor.

According to the above configuration, the display device is made up of any of the above displays that are widely used in electronic devices for daily use. This makes it possible to provide a touch panel system having high versatility. Further, the display device 2 having the InGaZnO-based oxide semiconductor can realize display of a high definition image with greatly reduced electric power consumption.

An electronic device according to Aspect 9 of the present invention includes, in any one of Aspects 1 through 8, any one of the above described touch panel systems.

Therefore, it is possible to provide an electronic device that can prevent erroneous recognition of a touch operation.

The present invention is not limited to the embodiments, but can be altered by a skilled person in the art within the scope of the claims. An embodiment derived from a proper combination of technical means disclosed in respective different embodiments is also encompassed in the technical scope of the present invention. Further, it is possible to form a new technical feature by combining the technical means disclosed in the respective embodiments.

INDUSTRIAL APPLICABILITY

The present invention is applicable to various electronic devices each of which includes a touch panel. The various electronic devices encompass a television, a personal computer, a mobile phone, a digital camera, a portable game device, an electronic photo frame, a mobile information terminal, an electronic book, household electric appliances, a ticket vending machine, an ATM, a car navigation device, and the like.

REFERENCE SIGNS LIST

1 Touch Panel System
2 Display Device
3 Touch Panel
5 Touch Position Detecting Section
10 Mobile Phone (Electronic Device)
56 Touch Start Determining Section
56a Touch Information Storage Section
56b Touch Status Determining Section

The invention claimed is:

1. A touch panel system comprising:
a touch panel; and
a touch position detecting section for detecting a touch position on the touch panel,
the touch position detecting section including:
a touch start determining section for (i) setting a determining region based on a touch start position candidate which is a touch position that has been detected relatively earliest and (ii) determining that touches have been started from the touch start position candidate in a case where the touches whose starting point is at the touch start position candidate have been successively detected within the determining region a predetermined number of times or more,
the touch start determining section setting the determining region so that an area of the determining region is proportional to at least two successive touches after the touch at the touch start position candidate.

2. The touch panel system as set forth in claim 1, wherein:
in a case where touches whose starting point is at the touch start position candidate have not been successively detected within the determining region the predetermined number of times or more, the touch start determining section does not output, as a touch, the touches whose starting point is at the touch start position candidate.

3. The touch panel system as set forth in any one of claim 1, wherein:
the touch start determining section sets the determining region based on at least one of a scanning cycle of the touch panel, an area of the touch panel, and the predetermined number of times.

4. The touch panel system as set forth claims 1, wherein:
the touch start determining section sets the determining region so that the determining region has a circular shape whose center is at the touch start position candidate.

5. The touch panel system as set forth in claim 2, wherein:
the touch start determining section sets the determining region based on at least one of a scanning cycle of the touch panel, an area of the touch panel, and the predetermined number of times.

6. The touch panel system as set forth in claim 2, wherein:
the touch start determining section sets the determining region so that the determining region has a circular shape whose center is at the touch start position candidate.

7. The touch panel system as set forth in claim 3, wherein:
the touch start determining section sets the determining region so that the determining region has a circular shape whose center is at the touch start position candidate.

* * * * *